US012737081B2

(12) United States Patent
An et al.

(10) Patent No.: US 12,737,081 B2
(45) Date of Patent: Sep. 15, 2026

(54) TOUCH DISPLAY DEVICE AND LEVEL SHIFTER FOR TOUCH DISPLAY DEVICE

(71) Applicant: LG Display Co., Ltd., Seoul (KR)

(72) Inventors: Sangug An, Gumi-si (KR); SungIl Byun, Daegu (KR)

(73) Assignee: LG Display Co., Ltd., Seoul (KR)

(*) Notice: Subject to any disclaimer, the term of this patent is extended or adjusted under 35 U.S.C. 154(b) by 0 days.

(21) Appl. No.: 18/952,213

(22) Filed: Nov. 19, 2024

(65) Prior Publication Data

US 2025/0077025 A1 Mar. 6, 2025

Related U.S. Application Data

(63) Continuation of application No. 18/536,058, filed on Dec. 11, 2023, now Pat. No. 12,182,362, which is a continuation of application No. 17/940,919, filed on Sep. 8, 2022, now Pat. No. 11,874,996.

(30) Foreign Application Priority Data

Sep. 10, 2021 (KR) ........................ 10-2021-0121232

(51) Int. Cl.

*G06F 3/041* (2006.01)
*G06F 3/044* (2006.01)

(52) U.S. Cl.

CPC .......... *G06F 3/0418* (2013.01); *G06F 3/0412* (2013.01); *G06F 3/04164* (2019.05); *G06F 3/0446* (2019.05)

(58) Field of Classification Search

CPC .. G06F 3/0418; G06F 3/04164; G06F 3/0412; G06F 3/0446

See application file for complete search history.

(56) References Cited

U.S. PATENT DOCUMENTS

2014/0111446 A1 4/2014 Lee et al.
2014/0253212 A1 9/2014 Steedman et al.
2016/0253001 A1 9/2016 Sugita et al.
2016/0291740 A1 10/2016 Yang et al.
2019/0081471 A1* 3/2019 Park ......................... H02H 3/08
2019/0212856 A1 7/2019 Ding et al.

(Continued)

FOREIGN PATENT DOCUMENTS

CN 108984054 A 12/2018
CN 210155644 U 3/2020
EP 2383890 B1 12/2016

(Continued)

*Primary Examiner* — Lisa S Landis

(74) *Attorney, Agent, or Firm* — Seed Intellectual Property Law Group LLP

(57) ABSTRACT

Embodiments of the disclosure relate to a touch display device and a level shifter for a touch display device. Specifically, embodiments of the disclosure may provide a touch display device comprising a plurality of touch electrodes and an overcurrent detection circuit configured to detect a current flowing through at least one touch pad electrically connected with at least one touch electrode among the plurality of touch electrodes. Thus, embodiments of the disclosure may provide a touch display device and a level shifter for a touch display device, which may increase the accuracy of touch sensing and easily determine whether the touch panel has an abnormality.

33 Claims, 13 Drawing Sheets

(56) References Cited

U.S. PATENT DOCUMENTS

| | | | |
|---|---|---|---|
| 2020/0150847 A1* | 5/2020 | Jang | G06F 3/0443 |
| 2020/0350385 A1 | 11/2020 | Wang et al. | |

FOREIGN PATENT DOCUMENTS

| | | |
|---|---|---|
| JP | 2020523683 A | 8/2020 |
| KR | 20150064419 A | 6/2015 |
| KR | 20180047726 A | 5/2018 |
| KR | 20190030422 A | 3/2019 |
| KR | 20190081532 A | 7/2019 |

* cited by examiner

AA
BZ
BD
NT
X-TE
X-CL
Y-TE
Y-CL
BANK
Y-TL
Y-TL1
Y-TL2
Y-TL3
Y-TL4
Y-BE
CH
Y-BL
DAM1
DAM
DAM2
Y-TP
PLN
E1
EL
E2
ED
SE
GE
SEMI
DE
T1
PAC
ILD
T-BUF
PAS2
PCL
PAS1
ENCAP
INS
GI
SUB

TOUCH DISPLAY DEVICE AND LEVEL SHIFTER FOR TOUCH DISPLAY DEVICE

CROSS-REFERENCE TO RELATED APPLICATION

This application is a continuation of U.S. patent application Ser. No. 18/536,058, filed Dec. 11, 2023, which is a continuation of U.S. patent application Ser. No. 17/940,919, filed Sep. 8, 2022, which claims priority from Korean Patent Application No. 10-2021-0121232, filed on Sep. 10, 2021, all of which are hereby incorporated by reference for all purposes as if fully set forth herein.

BACKGROUND

Technical Field

The disclosure relates to a touch display device and a level shifter for a touch display device and, more particularly, to a touch display device capable of detecting an overcurrent input to a touch panel, and a level shifter for the touch display device.

Description of the Related Art

The growth of the intelligent society leads to increased demand for image display devices and use of various types of display devices, such as liquid crystal displays, organic light emitting displays, etc.

The display device recognizes the user's touch on the display panel and performs input processing based on the recognized touch so as to provide more various functions to the user.

Meanwhile, in the organic light emitting display device, a plurality of touch electrodes may be disposed on an encapsulation layer disposed on the organic light emitting elements to provide a touch sensing function.

The touch display device may further include a touch driving circuit for outputting touch driving signals to the plurality of touch electrodes disposed on the encapsulation layer.

BRIEF SUMMARY

The touch driving signal output from the touch driving circuit is directly input to the touch electrode, but the signal strength is too small to drive the plurality of touch driving electrodes disposed on the encapsulation layer, so that the accuracy of touch sensing is degraded.

Accordingly, the inventors of the disclosure have invented a level shifter in various embodiments for a touch display device capable of increasing the signal strength of the touch driving signal input to the touch electrode by shifting the signal level of the touch driving signal between the touch driving circuit and the touch electrode, and a touch display device including the same.

The inventors of the disclosure have invented a level shifter in various embodiments for a touch display device, which further includes an overcurrent detection circuit electrically connected with the output pin of the level shifter to address unawareness of whether a short circuit occurs between touch electrodes disposed on different touch electrode lines as the level shifter is interposed between the touch driving circuit and the touch driving electrode, and a touch display device including the same.

A technical benefit to be achieved according to embodiments of the disclosure is to provide a level shifter for a touch display device capable of shifting the voltage level of the touch driving signal output from the touch driving circuit and outputting the touch driving signal to the touch electrode and a touch display device including the same.

A technical benefit to be achieved according to embodiments of the disclosure is to provide a level shifter for a touch display device capable of easily recognizing an abnormality (e.g., short circuit between touch electrodes disposed on different touch electrode lines) of the touch panel based on the current flowing to the output pin of the level shifter and a touch display device including the same.

Technical benefits of the disclosure are not limited to the foregoing, and other unmentioned technical benefits would be apparent to one of ordinary skill in the art from the following description.

According to an embodiment of the disclosure, there may be provided a touch display device comprising a plurality of touch electrodes and an overcurrent detection circuit configured to detect a current flowing through at least one touch pad electrically connected with at least one touch electrode among the plurality of touch electrodes.

According to an embodiment of the disclosure, there may be provided a level shifter for a touch display device comprising a plurality of output pins and an overcurrent detection circuit for detecting whether an overcurrent flows through the plurality of output pins, wherein the level shifter shifts a voltage level of an alternating current (AC) signal output from a touch driving circuit and outputs the level-shifted signal to a touch panel.

According to embodiments of the disclosure, it is possible to increase the accuracy of touch sensing by using a level shifter for a touch display device capable of shifting the voltage level of the touch driving signal output from the touch driving circuit and outputting the touch driving signal to the touch electrode and a touch display device including the same.

According to embodiments of the disclosure, it is possible to easily recognize an abnormality of the touch panel by using a level shifter for a touch display device capable of easily recognizing an abnormality (e.g., short circuit between touch electrodes disposed on different touch electrode lines) of the touch panel based on the current flowing to the output pin of the level shifter and a touch display device including the same.

DESCRIPTION OF THE SEVERAL VIEWS OF THE DRAWINGS

The above and other technical benefits, features, and advantages of the present disclosure will be more clearly understood from the following detailed description, taken in conjunction with the accompanying drawings, in which.

DETAILED DESCRIPTION

Figure 1:
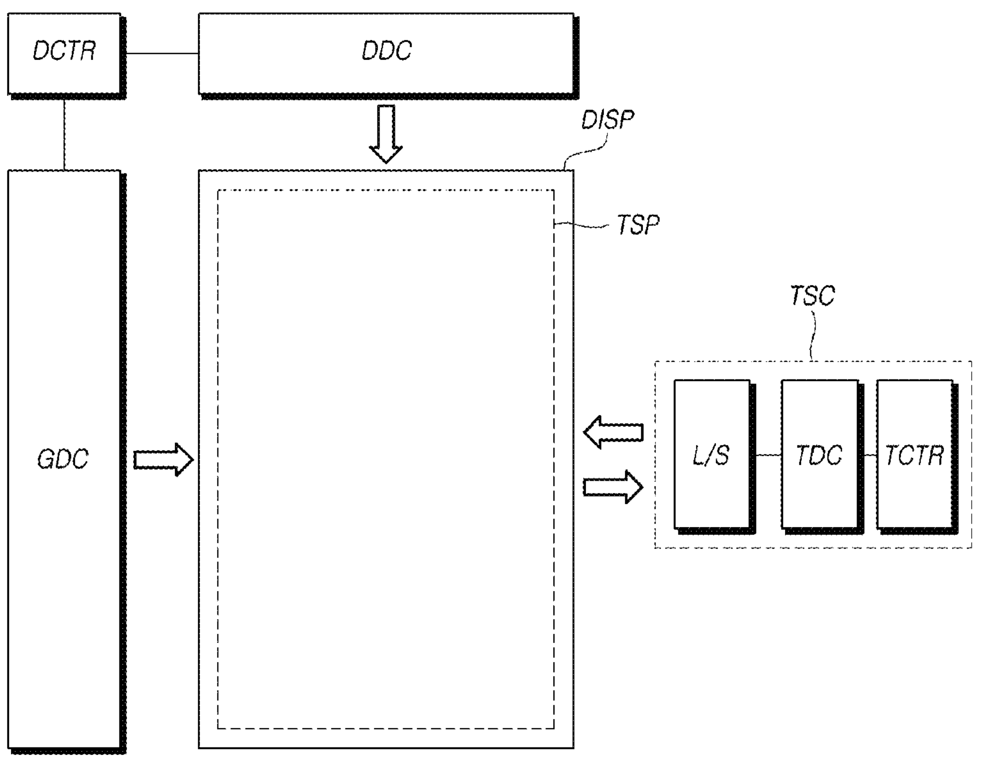
FIG. 1 is a view schematically illustrating a system configuration of a touch display device according to embodiments of the disclosure.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including," "having," "containing," "constituting," "make up of," and "formed of" used herein are generally intended to allow other components to be added unless the terms are used with the term "only." As used herein, singular forms are intended to include plural forms unless the context clearly indicates otherwise.

Terms, such as "first," "second," "A," "B," "(A)," or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to," "contacts or overlaps," etc., a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc., each other via a fourth element. Here, the second element may be included in at least one of two or more elements that "are connected or coupled to," "contact or overlap," etc., each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc., are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can."

FIG. 1 is a view schematically illustrating a system configuration of a touch display device according to embodiments of the disclosure.

Referring to FIG. 1, the touch display device according to embodiments of the disclosure may provide both a function for displaying images and a function for touch sensing.

To provide the image display function, the touch display device according to embodiments of the disclosure may include a display panel DISP, where a plurality of data lines and a plurality of gate lines are arranged, and a plurality of subpixels are arranged at regions of overlap of the plurality of data lines and the plurality of gate lines, a data driving circuit DDC for driving the plurality of data lines, a gate driving circuit GDC for driving the plurality of gate lines, and a display controller DCTR for controlling the data driving circuit DDC and the gate driving circuit GDC.

The data driving circuit DDC, the gate driving circuit GDC, and the display controller DCTR each may be implemented as one or more individual components. In some cases, two or more of the data driving circuit DDC, the gate driving circuit GDC, and the display controller DCTR may be integrated into a single component. For example, the data driving circuit DDC and the display controller DCTR may be implemented as a single integrated circuit (IC) chip.

To provide the touch sensing function, the touch display device according to embodiments of the disclosure may include a touch panel TSP including a plurality of touch electrodes and a touch sensing circuit TSC supplying touch driving signals to the touch panel TSP, detecting touch sensing signals from the touch panel TSP, and sensing whether there is the user's touch or the position of a touch (touch coordinates) on the touch panel TSP based on the detected touch sensing signals.

As an example, the touch sensing circuit TSC may include a touch driving circuit TDC supplying touch driving signals to the touch panel TSP and detecting touch sensing signals from the touch panel TSP and a touch controller TCTR sensing whether there is the user's touch on the touch panel TSP and/or the position of a touch based on the touch sensing signal detected by the touch driving circuit TDC.

The touch driving circuit TDC may include a first circuit part supplying touch driving signals to the touch panel TSP and a second circuit part detecting touch sensing signals from the touch panel TSP.

The touch driving circuit TDC and the touch controller TCTR may be implemented as separate components or, in some cases, be integrated into a single component.

The data driving circuit DDC, the gate driving circuit GDC, and the touch driving circuit TDC each may be implemented as one or more integrated circuits and, in light of electrical connection with the display panel DISP, they may be implemented in a chip-on-glass (COG) type, chip-on-film (COF) type, or tape-carrier-package (TCP) type. The gate driving circuit GDC may also be implemented in a gate-in-panel (GIP) type.

The touch display device according to embodiments of the disclosure may come in various types, e.g., as an organic light emitting touch display device or a liquid crystal touch display device. The touch display device may also be a touch display device including light emitting elements formed of inorganic light emitting diodes, micro light emitting diodes, or quantum dots. For convenience of description, the following description focuses primarily on examples in which the touch display device is an organic light emitting touch display device, but the touch display device according to embodiments of the disclosure is not limited thereto.

The touch display device according to embodiments of the disclosure may further include a level shifter L/S configured to control the voltage level of the touch driving signal output from the touch driving circuit TDC and output it to the touch panel TSP.

When the touch driving signal is applied to two or more touch electrodes disposed on the encapsulation layer, the accuracy of touch sensing may be reduced. To address the foregoing issues, the touch display device according to embodiments of the disclosure may further include a level shifter L/S for controlling the voltage level of the touch driving signal.

The level shifter L/S may be electrically connected to each of the touch driving circuit TDC and the touch pad disposed on the touch panel TSP. The level shifter L/S may amplify the signal strength of the touch driving signal output from the touch driving circuit TDC and output the level-shifted touch driving signal to the touch panel TSP.

The level shifter L/S may be a level shifter L/S for a touch display device. Hereinafter, it is simply referred to as a level shifter L/S.

The level shifter L/S may be implemented as a separate component or, in some cases, may be implemented to be integrated with the touch driving circuit TDC and/or the touch controller TCTR into one component.

The touch panel TSP may be present outside the display panel DISP. In other words, the touch panel TSP and the display panel DISP may be separately manufactured and then combined together. Such touch panel TSP is referred to as an external type or add-on type.

Unlike this, the touch panel TSP may be embedded in the display panel DISP. In other words, when the display panel DISP is manufactured, the touch sensor structure of, e.g., the plurality of touch electrodes and the plurality of touch lines constituting the touch panel TSP, may be formed along with signal lines and electrodes for display driving. Such touch panel TSP is referred to as an embedded type. In the following example, the touch panel TSP is formed in the embedded type for case of description.

Figure 2:
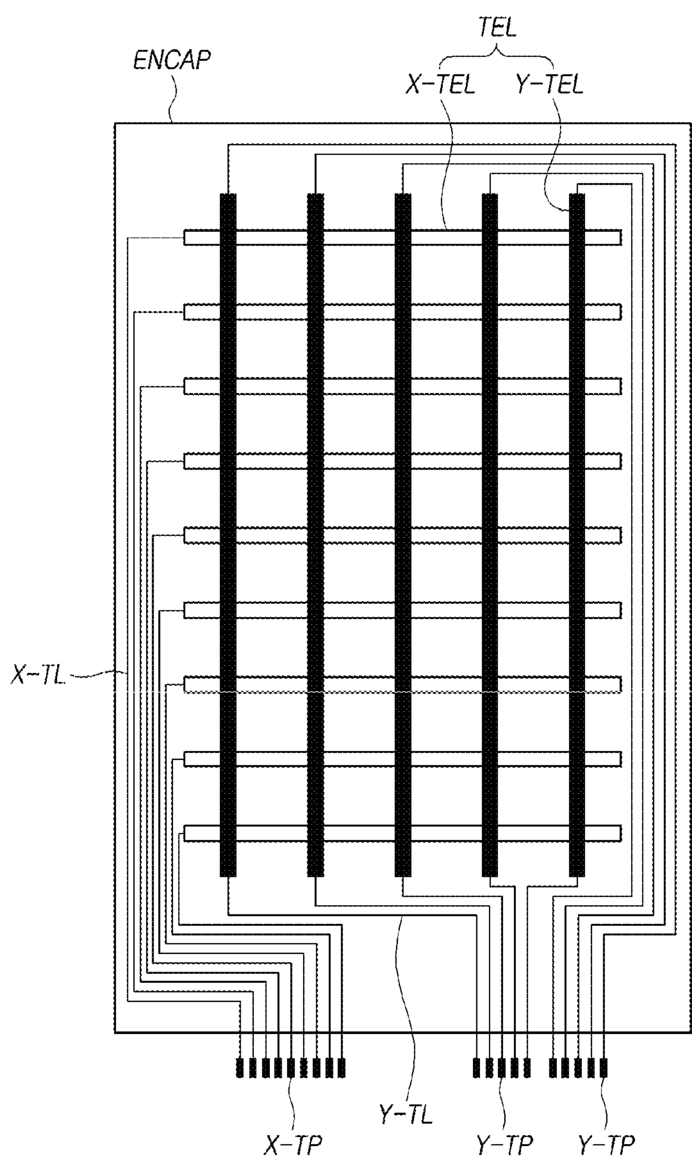
FIG. 2 is a view illustrating an example touch sensing structure based on mutual capacitance in a touch display device according to an embodiment of the disclosure.

FIG. 2 is a view illustrating an example touch sensing structure based on mutual capacitance in a touch display device according to an embodiment of the disclosure.

Referring to FIG. 2, a mutual capacitance-based touch sensing structure in a touch display device according to an embodiment of the disclosure may include a plurality of X-touch electrode lines X-TEL and a plurality of Y-touch electrode lines Y-TEL. The plurality of X-touch electrode lines X-TEL and the plurality of Y-touch electrode lines Y-TEL may be positioned on an encapsulation layer ENCAP.

The plurality of X-touch electrode lines X-TEL may be disposed in a first direction, and the plurality of Y-touch electrode lines Y-TEL may be disposed in a second direction different from the first direction.

In the disclosure, the first direction and the second direction may be relatively different directions. As an example, the first direction may be the x-axis direction, and the second direction may be the y-axis direction. In contrast, the first direction may be the y-axis direction, and the second direction may be the x-axis direction. The first direction and the second direction may be, or may not be, perpendicular to each other.

The plurality of X-touch electrode lines X-TEL may include a plurality of electrically connected X-touch electrodes (not shown), and the plurality of Y-touch electrode lines Y-TEL may include a plurality of electrically connected Y-touch electrodes (not shown).

The plurality of X-touch electrodes and the plurality of Y-touch electrodes are included in the plurality of touch electrodes TE and whose roles (functions) are distinguished. For example, the plurality of X-touch electrodes constituting the plurality of X-touch electrode lines X-TEL may be touch driving electrodes, and the plurality of Y-touch electrodes constituting the plurality of Y-touch electrode lines Y-TEL may be touch sensing electrodes. In this case, the plurality of X-touch electrode lines X-TEL correspond to touch driving electrode lines, and the plurality of Y-touch electrode lines Y-TEL correspond to touch sensing electrode lines.

Conversely, the plurality of X-touch electrodes constituting the plurality of X-touch electrode lines X-TEL may be touch sensing electrodes, and the plurality of Y-touch electrodes constituting the plurality of Y-touch electrode lines Y-TEL may be touch driving electrodes. In this case, the plurality of X-touch electrode lines X-TEL correspond to touch sensing electrode lines, and the plurality of Y-touch electrode lines Y-TEL correspond to touch driving electrode lines.

A touch sensor metal for touch sensing may include a plurality of touch lines TL as well as the plurality of X-touch electrode lines X-TEL and the plurality of Y-touch electrode lines Y-TEL.

The plurality of touch lines TL may include one or more X-touch lines X-TL connected to the plurality of X-touch electrode lines X-TEL and one or more Y-touch lines Y-TL connected to the plurality of Y-touch electrode lines Y-TEL.

Each of the plurality of X-touch electrode lines X-TEL may include a plurality of X-touch electrodes arranged in the same row (or column) and one or more X-touch electrode connection lines (not shown) electrically connecting the same. The X-touch electrode connection line connecting two adjacent X-touch electrodes may be a metal integrated with the two adjacent X-touch electrodes or a metal connected to the two adjacent X-touch electrodes through a contact hole.

The plurality of Y-touch electrode lines Y-TEL may include a plurality of Y-touch electrodes arranged in the same column (or row) and one or more Y-touch electrode connection lines (not shown) electrically connecting the same. The Y-touch electrode connection line connecting two adjacent Y-touch electrodes may be a metal integrated with the two adjacent Y-touch electrodes or a metal connected to the two adjacent Y-touch electrodes through a contact hole.

In the crossing area (touch electrode line crossing area) of the X-touch electrode line X-TEL and the Y-touch electrode line Y-TEL, the X-touch electrode connection line and the Y-touch electrode connection line may cross each other.

As such, when the X-touch electrode connection line and the Y-touch electrode connection line cross each other in the touch electrode line crossing area, the X-touch electrode connection line and the Y-touch electrode connection line may be positioned on different layers. For the plurality of X-touch electrode lines X-TEL and the plurality of Y-touch electrode lines Y-TEL to be arranged to cross each other, the plurality of X-touch electrodes, the plurality of X-touch electrode connection lines, the plurality of Y-touch electrodes, and the plurality of Y-touch electrode connection lines may be positioned on two or more layers.

The plurality of X-touch electrode lines X-TEL are electrically connected to corresponding X-touch pads X-TP through one or more X-touch lines X-TL. In other words, the outermost X-touch electrode among the plurality of X-touch electrodes included in one X-touch electrode line X-TEL is electrically connected with the corresponding X-touch pad X-TP through the X-touch line X-TL.

The plurality of Y-touch electrode lines Y-TEL are electrically connected to corresponding Y-touch pads Y-TP through one or more Y-touch lines Y-TL. In other words, the outermost Y-touch electrode among the plurality of Y-touch electrodes included in one Y-touch electrode line Y-TEL is electrically connected with the corresponding Y-touch pad Y-TP through the Y-touch line Y-TL.

When the plurality of X-touch electrodes constituting the plurality of X-touch electrode lines X-TEL are touch driving electrodes, the touch driving signal level-shifted is supplied to the plurality of X-touch electrodes through the plurality of X-touch lines X-TL. Further, when the plurality of Y-touch electrodes constituting the plurality of Y-touch electrode lines Y-TEL are touch sensing electrodes, the touch sensing signal generated at the plurality of Y-touch electrodes is to be transferred to the touch driving circuit TDC through the Y-touch line Y-TL.

In this case, the plurality of X-touch lines X-TL and the plurality of Y-touch lines Y-TL may extend along the non-display area positioned outside the display area. The plurality of X-touch lines X-TL and the plurality of Y-touch lines Y-TL may partially overlap in the non-display area.

For example, when the plurality of X-touch lines X-TL and the plurality of Y-touch lines Y-TL are formed on different layers in the non-display area, the plurality of X-touch lines X-TL and the plurality of Y-touch lines Y-TL may overlap in some sections around the display area.

In this case, in an area adjacent to the touch pad (e.g., X-touch pad X-TP and/or Y-touch pad Y-TP; also simply referred to as touch pad TP), the touch line (e.g., X-touch line X-TL and/or Y-touch line Y-TL; also simply referred to as touch line TL) may be formed to have a single electrode structure for transferring a touch signal or may be formed to have a double stacked structure connected through at least one contact hole to reduce electrical resistance to the touch signal or just preparation for the case of disconnection.

When the touch line TL is configured in a double stacked structure, a touch bridge line extending in the same direction as the touch line TL may be positioned vertically above and under the touch line TL, and the touch line TL and the touch bridge line may have one or more contact holes for electrical connection formed at regular intervals.

In contrast, when the plurality of X-touch lines X-TL and the plurality of Y-touch lines Y-TL are formed on the same layer, there may be no overlapping areas.

Figure 3:
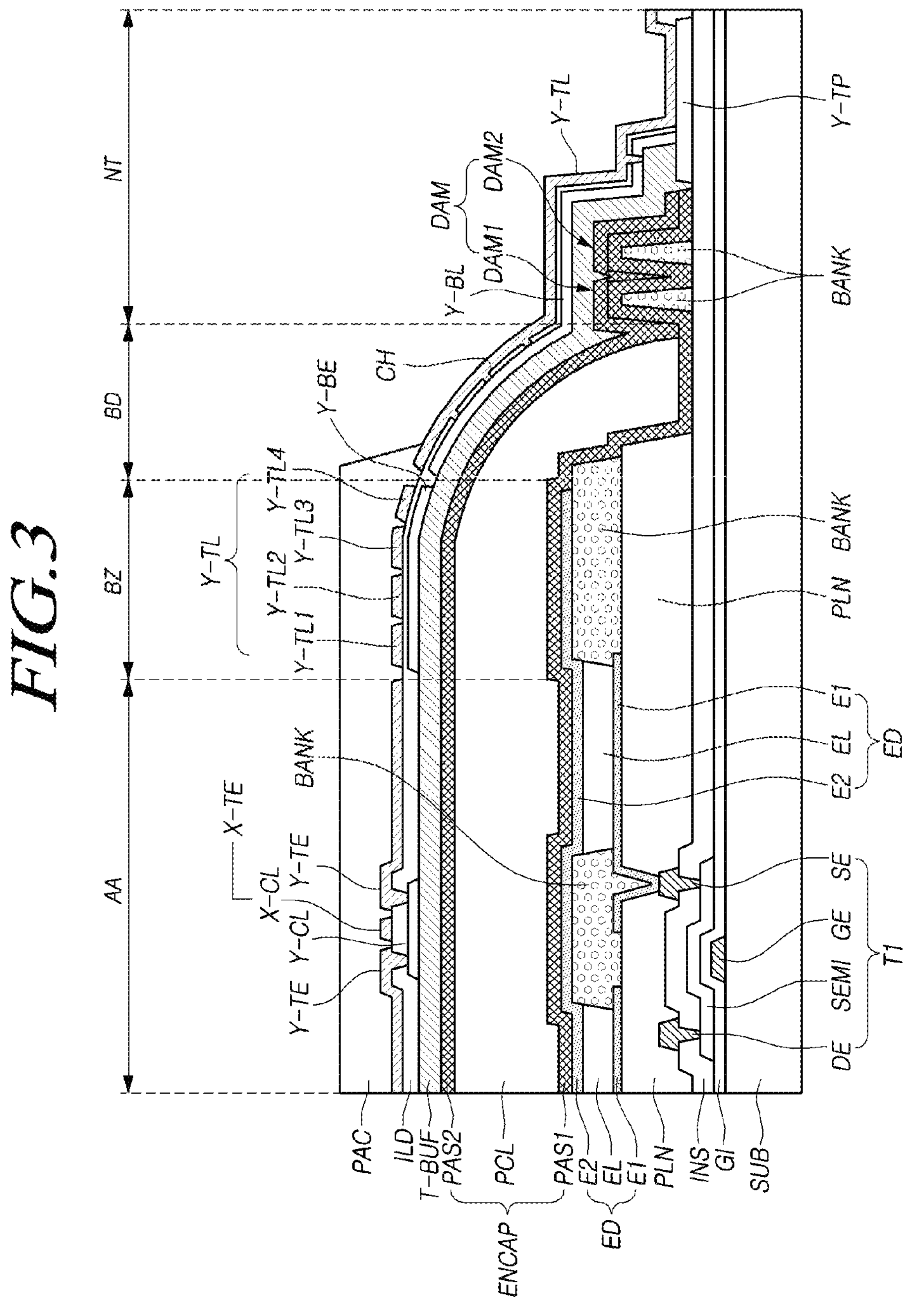
FIG. 3 is a cross-sectional view illustrating a touch display device according to an embodiment of the disclosure.

FIG. 3 is a cross-sectional view illustrating a touch display device according to an embodiment of the disclosure.

FIG. 3 illustrates a plate-shaped Y-touch electrode Y-TE, but this is merely an example. For example, a mesh-type touch electrode TE may be used.

Referring to FIG. 3, in the touch display device according to an embodiment of the disclosure, a first transistor T1, as a driving transistor, may be disposed on the substrate SUB in the subpixel SP positioned in the display area AA.

The first transistor T1 may include a gate electrode GE, a source electrode SE or a drain electrode DE, and a semiconductor layer SEMI.

The gate electrode GE and the semiconductor layer SEMI may overlap each other, with the gate insulation film GI interposed therebetween. The source electrode SE may be formed on an insulation layer INS to contact one side of the semiconductor layer SEMI, and the drain electrode DE may be formed on the insulation layer INS to contact the other side of the semiconductor layer SEMI.

The light emitting element ED may include a first electrode E1, which corresponds to the anode electrode (or cathode electrode), a light emitting layer EL formed on the first electrode E1, and a second electrode E2 formed on the light emitting layer EL and corresponding to the cathode electrode (or anode electrode).

The first electrode E1 is electrically connected with the source electrode SE of the first transistor T1, exposed through a contact hole which passes through a planarization film PLN.

The light emitting layer EL is formed on the first electrode E1 in a light emitting area provided by a bank BANK. The light emitting layer EL may be formed in the order of hole-related layer, light emitting layer, and electron-related layer, or its reverse order, on the first electrode E1. The second electrode E2 may be formed to face the first electrode E1, with the light emitting layer EL disposed therebetween.

The encapsulation layer ENCAP blocks penetration of external moisture or oxygen into the light emitting element ED which is vulnerable to external moisture or oxygen. The encapsulation layer ENCAP may be formed of one layer or may include a stacked structure of a plurality of layers PAS1, PCL, and PAS2.

For example, when the encapsulation layer ENCAP is formed of a stacked structure of a plurality of layers PAS1, PCL, and PAS2, the encapsulation layer ENCAP may include one or more inorganic encapsulation layers PAS1 and PAS2 and one or more organic encapsulation layer PCL. As a specific example, in the encapsulation layer ENCAP, the first inorganic encapsulation layer PAS1, the organic encapsulation layer PCL, and the second inorganic encapsulation layer PAS2 may be stacked in the order thereof.

The organic encapsulation layer PCL may further include at least one organic encapsulation layer or at least one inorganic encapsulation layer.

The first inorganic encapsulation layer PAS1 is positioned on the substrate SUB where the second electrode E2 is formed to be closest to the light emitting element ED. The first inorganic encapsulation layer PAS1 is formed of an inorganic insulation material capable of low-temperature deposition, e.g., silicon nitride (SiNx), silicon oxide (SiOx), silicon oxynitride (SiON), or aluminum oxide (Al2O3). Since the first inorganic encapsulation layer PAS1 is deposed at low-temperature atmosphere, the first inorganic encapsulation layer PAS1 may prevent damage to the light emitting layer EL including the organic material vulnerable to high-temperature atmosphere during deposition.

The organic encapsulation layer PCL may be formed in a smaller area than the first inorganic encapsulation layer PAS1 in which case the organic encapsulation layer PCL may be formed to expose both end tips of the first inorganic encapsulation layer PAS1. The organic encapsulation layer PCL serves to mitigate stress between the layers due to a warping of the touch display device which is an OLED device, while reinforcing the planarization performance. The organic encapsulation layer PCL may be formed of, e.g., an acrylic resin, epoxy resin, polyimide, polyethylene, silicon oxycarbide (SiOC), or other organic insulation materials.

When the organic encapsulation layer PCL is formed in an inkjet method, one or two dams DAM may be formed in the boundary area between the non-display area and the display area AA or the dam area which corresponds to a portion of the non-display area.

For example, the dam area may be positioned between the display area AA and the pad area where the plurality of touch pads TP are formed in the non-display area and, in the dam area, a primary dam DAM1 adjacent to the display area AA, and a secondary dam DAM2 adjacent to the pad area may exist.

The one or more dams DAM disposed in the dam area may prevent the liquid-state organic encapsulation layer PCL from collapsing to the non-display area and resultantly penetrating into the pad area when the liquid-phase organic encapsulation layer PCL is loaded on the display area AA.

The primary dam DAM1 or the secondary dam DAM2 may be formed in a single-layer structure or multi-layer structure. For example, the primary dam DAM1 or the secondary dam DAM2 may simultaneously be formed of the same material as at least one of the bank BANK and a spacer (not shown). In this case, a dam structure may be formed without a masking process or cost rise.

The primary dam DAM1 or the secondary dam DAM2 may be structured so that the first inorganic encapsulation layer PAS1 and the second inorganic encapsulation layer PAS2 are stacked on the bank BANK. In this case, the organic encapsulation layer PCL containing an organic material may be positioned on an inner surface of the primary dam DAM1 or be positioned on the top of at least a portion of the primary dam DAM1 and the secondary dam DAM2.

The second inorganic encapsulation layer PAS2 may be formed over the substrate SUB, where the organic encapsulation layer PCL is formed, to cover the upper surface and side surfaces of each of the organic encapsulation layer PCL and the first inorganic encapsulation layer PAS1. The second inorganic encapsulation layer PAS2 reduces, minimizes or blocks penetration of external moisture or oxygen into the first inorganic encapsulation layer PAS1 and the organic encapsulation layer PCL. The second inorganic encapsulation layer PAS2 is formed of an inorganic insulation material, e.g., silicon nitride (SiNx), silicon oxide (SiOx), silicon oxynitride (SiON), or aluminum oxide (Al2O3).

A touch buffer layer T-BUF may be disposed on the encapsulation layer ENCAP. The touch buffer layer T-BUF may be positioned between the touch sensor metal including the touch electrodes X-TE and Y-TE and the touch electrode connection lines X-CL and Y-CL, and the second electrode E2 of the light emitting element ED.

The touch buffer layer T-BUF may be designed to maintain a predetermined minimum spacing or selected spacing (e.g., 1 um) between the touch sensor metal and the second electrode E2 of the light emitting element ED. Thus, it is possible to reduce or prevent the parasitic capacitance formed between the touch sensor metal and the second electrode E2 of the light emitting element ED and hence prevent deterioration of touch sensitivity due to parasitic capacitance.

In contrast, without the touch buffer layer T-BUF, the touch sensor metal including the touch electrodes X-TE and Y-TE and the touch electrode connection lines X-CL and Y-CL may be disposed on the encapsulation layer ENCAP.

The touch buffer layer T-BUF may block off penetration, into the organic material-containing light emitting layer EL, of external moisture or the chemical (e.g., developer or etchant) used while manufacturing the touch sensor metal disposed on the touch buffer layer T-BUF. Thus, the touch buffer layer T-BUF may prevent damage to the light emitting layer EL vulnerable to chemicals or moisture.

The touch buffer layer T-BUF may be formed of an organic insulation material with a low permittivity and formed at a low temperature which is not more than a predetermined or selected temperature (e.g., 100° C.) to prevent damage to the light emitting layer EL containing the organic material vulnerable to high temperature. For example, the touch buffer layer T-BUF may be formed of an acrylic-based, epoxy-based, or siloxane-based material. The touch buffer layer T-BUF with planarizability, formed of an organic insulation material, may prevent fracture of the touch sensor metal formed on the touch buffer film T-BUF and damage to the internal layers PAS1, PCL, and PAS2 constituting the encapsulation layer ENCAP due to a warping of the OLED device.

In a mutual-capacitance-based touch sensor structure, the X-touch electrode line X-TEL and the Y-touch electrode line Y-TEL may be formed on the touch buffer layer T-BUF, and the X-touch electrode line X-TEL and the Y-touch electrode line Y-TEL may be disposed to cross each other. The Y-touch electrode line Y-TEL may include a plurality of Y-touch electrode connection lines Y-CL that electrically connect the plurality of Y-touch electrodes Y-TE.

In this case, the plurality of Y-touch electrodes Y-TE and the plurality of Y-touch electrode connection lines Y-CL may be positioned on different layers, with the inter-layer dielectric ILD interposed therebetween.

The plurality of Y-touch electrodes Y-TE may be spaced apart at a predetermined or selected interval along the y axis direction. The plurality of Y-touch electrodes Y-TE may be electrically connected with another Y-touch electrode Y-TE adjacent thereto in the y axis direction via the Y-touch electrode connection line Y-CL.

The Y-touch electrode connection line Y-CL may be formed on the touch buffer layer T-BUF and be exposed via the touch contact hole passing through the inter-layer dielectric ILD and be electrically connected with two Y-touch electrodes Y-TE adjacent in the y axis direction.

The Y-touch electrode connection line Y-CL may be disposed to overlap the bank BANK. Thus, it is possible to prevent a reduction in the aperture ratio due to the Y-touch electrode connection line Y-CL.

The X-touch electrode line X-TEL may include a plurality of X-touch electrode connection lines X-CL that electrically connect the plurality of X-touch electrodes X-TE. The plurality of X-touch electrodes X-TE and the plurality of X-touch electrode connection lines X-CL may be positioned on different layers, with the inter-layer dielectric ILD disposed therebetween.

The plurality of X-touch electrodes X-TE may be spaced apart at a predetermined or selected interval along the x axis direction, on the inter-layer dielectric ILD. The plurality of X-touch electrodes X-TE may be electrically connected with another X-touch electrode X-TE adjacent thereto in the x axis direction via the X-touch electrode connection line X-CL.

The X-touch electrode connection line X-CL may be disposed on the same plane as the X-touch electrode X-TE and be electrically connected with two X-touch electrodes X-TE adjacent thereto in the x axis direction without a separate contact hole or be integrated with the two X-touch electrodes X-TE adjacent thereto each other in the x axis direction.

The X-touch electrode connection line X-CL may be disposed to overlap the bank BANK. Thus, it is possible to prevent a reduction in the aperture ratio due to the X-touch electrode connection line X-CL.

The Y-touch electrode line Y-TEL may be electrically connected with the touch driving circuit TDC via the Y-touch line Y-TL and the Y-touch pad Y-TP. Likewise, the X-touch electrode line X-TEL may be electrically connected with the touch driving circuit TDC via the X-touch line X-TL and the X-touch pad X-TP.

A pad cover electrode may be further provided to cover the X-touch pad X-TP and the Y-touch pad Y-TP.

The level shifter L/S according to embodiments of the disclosure may be electrically connected to each of the X-touch pad X-TP and the touch driving circuit TDC or may be electrically connected to each of the Y-touch pad Y-TP and the touch driving circuit TDC.

The X-touch pad X-TP may be formed separately from the X-touch line X-TL or may extend from the X-touch line X-TL. The Y-touch pad Y-TP may be formed separately from the Y-touch line Y-TL or may extend from the Y-touch line Y-TL.

When the X-touch pad X-TP extends from the X-touch line X-TL, and the Y-touch pad Y-TP extends from the Y-touch line Y-TL, the X-touch pad X-TP, the X-touch line X-TL, the Y-touch pad Y-TP, and the Y-touch line Y-TL may be formed of the same first conductive material. The first conductive material may be formed in a single-layer or multi-layer structure using a metal with good corrosion or acid resistance or electric conductivity, such as Al, Ti, Cu, or Mo.

For example, the X-touch pad X-TP, X-touch line X-TL, Y-touch pad Y-TP, and Y-touch line Y-TL formed of the first conductive material may be formed in a three-layer stacked structure, such as Ti/Al/Ti or Mo/Al/Mo.

The pad cover electrode capable of covering the X-touch pad X-TP and Y-touch pad Y-TP may be formed of a second conductive material which is the same material as the X-touch electrode and Y-touch electrode X-TE and Y-TE. The second conductive material may be formed of a transparent conductive material, such as ITO or IZO, which has high corrosion or acid resistance. The pad cover electrode may be formed to be exposed by the touch buffer layer T-BUF and be thus bonded with the touch driving circuit TDC or a circuit film where the touch driving circuit TDC is mounted. A level shifter L/S may be further mounted on such a circuit film.

The touch buffer layer T-BUF may be formed to cover the touch sensor metal, preventing corrosion to the touch sensor metal by external moisture. As an example, the touch buffer layer T-BUF may be formed of an organic insulation material or as a circular polarizer or epoxy or acrylic film. The touch buffer layer T-BUF on the encapsulation layer ENCAP may be omitted. In other words, the touch buffer layer T-BUF may not be an essential component.

The Y-touch line Y-TL may be electrically connected with the Y-touch electrode via the touch line contact hole or be integrated with the Y-touch electrode Y-TE.

The Y-touch line Y-TL may extend up to the non-display area and be electrically connected with the Y-touch pad Y-TP via the top and side of the encapsulation layer ENCAP and the top and side of the dam DAM. Thus, the Y-touch line Y-TL may be electrically connected with the touch driving circuit TDC via the Y-touch pad Y-TP.

The Y-touch line Y-TL may transfer the touch sensing signal from the Y-touch electrode Y-TE to the touch driving circuit TDC or may receive the level-shifted touch driving signal from the level shifter L/S and transfer the level-shifted touch driving signal to the Y-touch electrode Y-TE.

In this case, in the notch area NT and bending area BD, the Y-touch bridge line Y-BL connected through the contact hole CH may be disposed under the Y-touch line Y-TL. Since the Y-touch line Y-TL and the Y-touch bridge line Y-BL are electrically connected through at least one contact hole CH formed at regular intervals, the same touch driving signal or touch sensing signal may be transferred.

As such, when the Y-touch line Y-TL and the Y-touch bridge line Y-BL are electrically connected, the electrical resistance may be reduced during the transfer of the touch driving signal or the touch sensing signal. Further, when connecting the Y-touch line Y-TL and the Y-touch bridge line Y-BL through a plurality of contact holes CH, the touch signal (touch driving signal or touch sensing signal) may get around through the contact hole CH although a disconnection occurs in the Y-touch line Y-TL or Y-touch bridge line Y-BL in some section, so that the performance of touch sensing may be maintained.

The area other than the contact hole CH may be insulated by the inter-layer dielectric ILD disposed between the Y-touch line Y-TL and the Y-touch bridge line Y-BL.

A plurality of Y-touch lines Y-TL1, Y-TL2, Y-TL3, and Y-TL4 may be disposed in the bezel area BZ, and the Y-touch bridge electrode Y-BE having an integrated structure may be disposed thereunder.

The Y-touch bridge electrode Y-BE may have an integrated structure and be formed to have the same width or a broader width than the Y-touch lines Y-TL1, Y-TL2, Y-TL3, and Y-TL4 to be able to cover the area occupied by the Y-touch lines Y-TL1, Y-TL2, Y-TL3, and Y-TL4 positioned thereabove.

In this case, the Y-touch bridge electrode Y-BE is connected to a ground voltage to discharge the noise charge introduced into the display panel DISP and is separated from the Y-touch bridge line Y-BL positioned in the bending area BD.

Thus, the noise charge introduced to the display panel DISP may easily be discharged to the ground voltage GND by the Y-touch bridge electrode Y-BE formed in an integrated structure to be able to cover the area occupied by the Y-touch lines Y-TL1, Y-TL2, Y-TL3, and Y-TL4, so that the touch sensing performance of the touch display device may be improved, and defects during display driving may be reduced.

The X-touch line X-TL may be electrically connected with the X-touch electrode X-TE via the touch contact hole or may be integrated with the X-touch electrode X-TE.

The X-touch line X-TL may extend up to the non-display area and be electrically connected with the X-touch pad X-TP via the top and side of the encapsulation layer ENCAP and the top and side of the dam DAM. Thus, the X-touch line X-TL may be electrically connected with the touch driving circuit TDC via the X-touch pad X-TP.

The X-touch line X-TL may receive the level-shifted touch driving signal from the level shifter L/S and transfer the level-shifted touch driving signal to the X-touch electrode X-TE and may transfer the touch sensing signal from the X-touch electrode X-TE to the touch driving circuit TDC.

Various changes may be made to the arrangement of the X-touch line X-TL and the Y-touch line Y-TL depending on the design of the display panel DISP.

A touch protection film PAC may be disposed on the X-touch electrode X-TE and the Y-touch electrode Y-TE. The touch protection film PAC may extend up to before or after the dam DAM and may thus be disposed even on the X-touch line X-TL and the Y-touch line Y-TL.

The cross-sectional views herein illustrate a conceptual structure of a touch display device. Depending on the direction or position in which it is viewed, the position, thickness, or width of each pattern (e.g., various layers or electrodes) may be varied, and the connection structure of various patterns may be varied, and an additional layer other than the layers shown may be present as well, or some of the layers may be omitted or combined. For example, the width of the bank BANK may be narrower than that shown in the drawings, and the height of the dam DAM may be higher or lower than shown.

The touch display device may be used in mobile devices, such as smart phones and tablet PCs, and may also be used in large-screen display devices, such as automobile displays and exhibition displays.

Such a touch display device may determine the presence and/or position of a touch by detecting the touch sensing signal transferred from the touch electrode TE in a single sensing or differential sensing scheme.

Figure 4A:
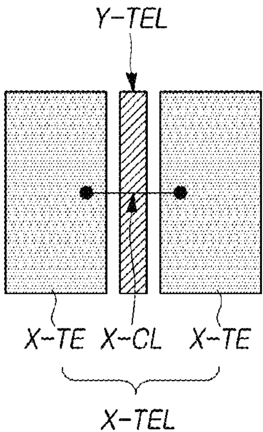
FIGS. 4A and 4B are views illustrating various example structures of a touch electrode line in a touch display device according to an embodiment of the disclosure.
Figure 4B:
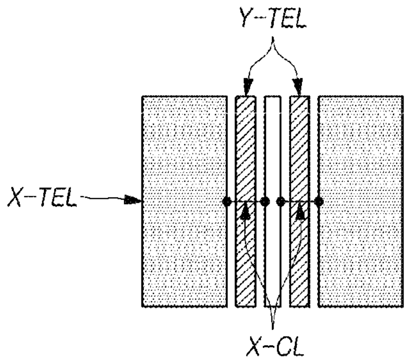

FIGS. 4A and 4B are views illustrating various example structures of a touch electrode line TEL in a touch display device according to an embodiment of the disclosure.

Referring to FIGS. 4A and 4B, a touch display device according to an embodiment of the disclosure may include a touch electrode line (e.g., an X-touch electrode line X-TEL and/or a Y-touch electrode line Y-TEL; simply referred to as a touch electrode line TEL) having various structures.

Referring to FIG. 4A, in the touch display device of the disclosure, an X-touch electrode line X-TEL including X-touch electrodes X-TE having the same shape and positioned on two opposite sides, in the x-axis direction, of a Y-touch electrode line Y-TEL having a single bar structure, which extends in the y-axis direction.

Referring to FIG. 4B, in the touch display device of the disclosure, two bar-shaped Y-touch electrode lines Y-TEL are disposed in a split structure, between thin X-touch electrode lines X-TEL, and X-touch electrode lines X-TEL having the same shape may be disposed on two opposite sides, in the x-axis direction, of the two bar-shaped Y-touch electrode lines Y-TEL.

In this case, the X-touch electrode lines X-TEL divided by the Y-touch electrode line Y-TEL may be electrically connected with each other through an X-touch electrode connection line X-CL.

The area of the X-touch electrode line X-TEL to which the level-shifted touch driving signal is applied may be identical to or different from the area of the Y-touch electrode line Y-TEL to which the touch sensing signal is transferred.

For example, to relatively reduce the parasitic capacitance by the Y-touch electrode line Y-TEL to which the touch sensing signal is transferred, the area of the Y-touch electrode line Y-TEL may be formed to be smaller than the area of the X-touch electrode line X-TEL. In this case, the ratio of the area of the X-touch electrode line X-TEL to which the level-shifted touch driving signal is applied to the area of the Y-touch electrode line Y-TEL to which the touch sensing signal is transferred may be 5:1 to 2:1. As an example, the ratio of the area of the X-touch electrode line X-TEL to the area of the Y-touch electrode line Y-TEL may be 4:1.

Various changes may be made to the structure of the touch electrode lines X-TEL and Y-TEL depending on the size or use of the touch display device.

Figure 5:
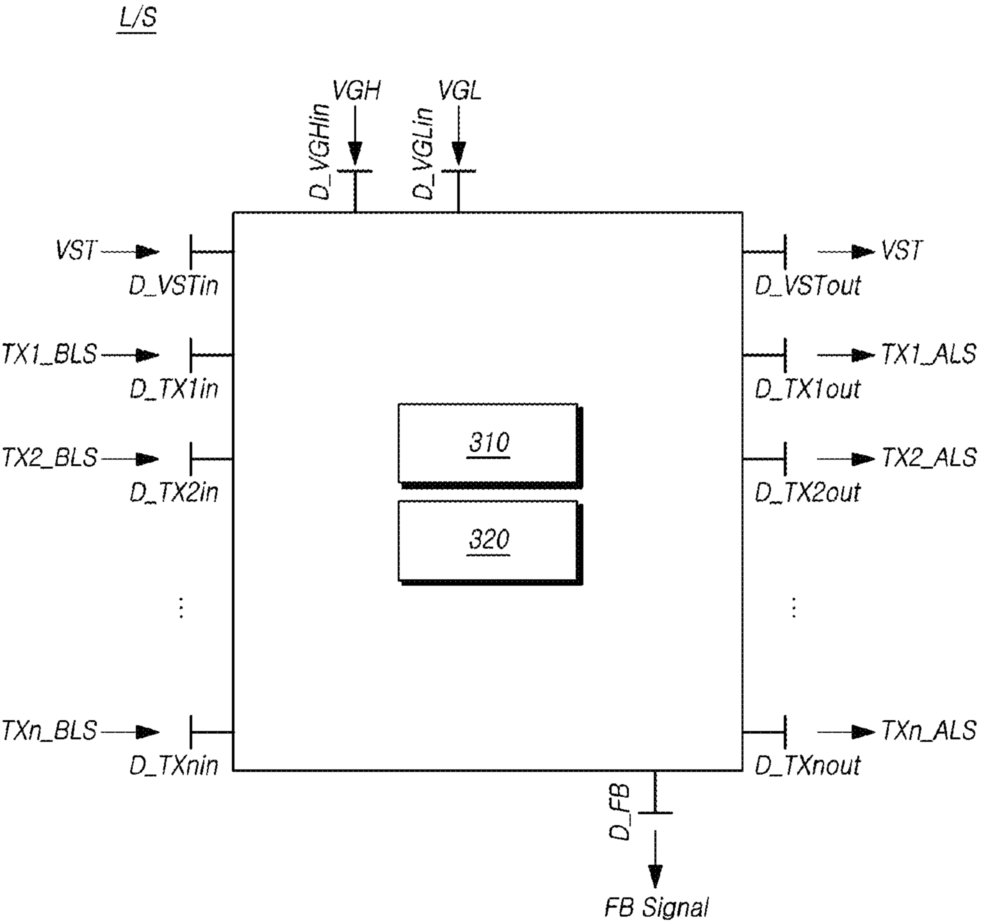
FIG. 5 is a view schematically illustrating a level shifter L/S according to embodiments of the disclosure.

FIG. 5 is a view schematically illustrating a level shifter L/S according to embodiments of the disclosure.

Referring to FIG. 5, a level shifter L/S may include a level shifting circuit 310 and a level shifter operation control circuit 320.

The level shifting circuit 310 may shift the voltage level of the signal input to each of the plurality of input pins D_TX1in to D_TXnin (hereinafter also abbreviated as D_TXin) and outputs the level-shifted signal to the plurality of output pins D_TX1out to D_TXnout (hereinafter also abbreviated as D_TXout) corresponding to the plurality of input pins D_TXin.

The plurality of input pins D_TXin may include a first input pin D_TX1in to an nth input pin D_TXnin (n is an integer equal to or larger than 2). The plurality of output pins D_TXout may include a first output pin D_TX1out to an nth output pin D_TXnout.

Each of the plurality of input pins D_TXin may correspond to any one output pin of the plurality of output pins D_TXout. In other words, the signal input to each of the plurality of input pins D_TXin may be level-shifted and output to any one output pin D_TXout among the plurality of output pins D_TXout.

For example, the signal input to the first input pin D_TX1in may be level-shifted and be output to the first output pin D_TX1out. For example, the signal input to the second input pin D_TX2in may be level-shifted and be output to the second output pin D_TX2out. For example, the signal input to the nth input pin D_TXnin may be level-shifted and be output to the nth output pin D_TXnout.

The plurality of output pins D_TXout are electrically connected to their respective corresponding ones of the above-described plurality of X-touch pads X-TP. The signals output from the plurality of output pins D_TXout pass through the X-touch pads X-TP electrically connected to their respective corresponding ones of the plurality of output pins D_TXout to the X-touch line X-TL and X-touch electrode line X-TEL.

An alternating current (AC) signal may be input to at least one input pin D_TXin among the plurality of input pins D_TXin. The AC signal may be a touch driving signal output from the above-described touch driving circuit.

The level shifting circuit 310 shifts the voltage level of the input AC signal and outputs the signal to the output pin D_TXout corresponding to the input pin D_TXin to which the AC signal is input. For example, the level shifting circuit 310 may alternately output a high-potential voltage and a low-potential voltage according to the voltage level change timings of the input AC signal.

The high-potential voltage may be, e.g., a gate high voltage VGH input to the display panel DISP (refer to FIG. 1 described above). The low-potential voltage may be, e.g., a gate low voltage VGL input to the display panel DISP. The voltage levels of the high-potential voltage and the low-potential voltage are not limited thereto.

The level shifting circuit 310 may receive a "pre-level shifting touch driving signal TX_BLS" and output a "post-level shifting touch driving signal TX_ALS."

For example, referring to FIG. 5, the pre-level shifting touch driving signal TX1_BLS input to the first input pin D_TX1in may be shifted for its voltage level and be level-shifted and be then output as the touch driving signal TX1_ALS through the first output pin D_TX1out.

For example, referring to FIG. 5, the pre-level shifting touch driving signal TXn_BLS input to the nth input pin D_TXnin may be shifted for its voltage level and be level-shifted and be then output as the touch driving signal TXn_ALS through the nth output pin D_TXnout.

The pre-level shifting touch driving signals TX_BLS may be input to the first input pin D_TX1in to the nth input pin D_TXnin sequentially or in a predetermined or selected order. In some cases, the pre-level shifting touch driving signal TX_BLS may be input to two or more input pins D_TXin.

The amplitude of the post-level shifting touch driving signal TX_ALS may be larger than the amplitude of the pre-level shifting touch driving signal TX_BLS.

While an AC signal (which may mean the pre-level shifting touch driving signal TX_BLS) is input to at least one input pin D_TXin among the plurality of input pins D_TXin, direct current (DC) signals may be input to the other input pins D_TXin than the at least one input pin D_TXin.

The level shifting circuit 310 outputs a low-potential voltage to the output pin D_TXout corresponding to each of the remaining input pins D_TXin. Here, the low-potential voltage may be a gate low voltage VGL.

Accordingly, the level shifter L/S may alternately output the high-potential voltage and the low-potential voltage to at least one output pin D_TXout among the plurality of output pins D_TXout and output the low-potential voltage to the other output pins D_TXout.

While any one output pin D_TXout among the plurality of output pins D_TXout of the level shifter L/S is electrically connected to the high-potential voltage source and the low-potential voltage source alternately, the remaining output pins D_TXout may remain electrically connected to the low-potential voltage source.

The high-potential voltage source may be, e.g., a voltage source that supplies the gate high voltage VGH. The low-potential voltage source may be, e.g., a voltage source that supplies the gate low voltage VGL.

Referring to FIG. 5, the level shifter L/S may include a high-potential voltage input pin D_VGHin and a low-potential voltage input pin D_VGLin.

A high-potential voltage may be input to the high-potential voltage input pin D_VGHin. The high-potential voltage may be, e.g., the gate high voltage VGH.

A low-potential voltage may be input to the low-potential voltage input pin D_VGLin. The low-potential voltage may be, e.g., the gate low voltage VGL.

The level shifter operation control circuit 320 may be a circuit that stops the operation of the level shifting circuit 310 when an overcurrent flows in any one of the plurality of output pins D_TXout. An operation in which the level shifter operation control circuit 320 detects overcurrent is described below.

The level shifter operation control circuit 320 may stop the operation of the level shifting circuit 310 when an overcurrent flows in any one of the output pins D_TXout, e.g., during the period from one start signal VST is input to the start signal input pin D_VSTin to the next start signal VST is input. It should be understood that "input" includes the meaning of "asserted." For example, the start signal VST may be an electrical signal that is alternately at a high voltage level or a low voltage level, and the start signal VST may be "input" or asserted when the high voltage level is present, and may be "not inputted" or deasserted when the low voltage level is present.

The level shifter operation control circuit 320 may output a feedback signal FB Signal which has a different value depending on whether the level shifting circuit 310 is shut down. The feedback signal FB Signal may be output from the feedback signal output pin D_FB of the level shifter L/S.

The level shifter operation control circuit 320 may output, e.g., a high-level feedback signal FB Signal when the level shifting circuit 310 operates normally and may output a low-level feedback signal FB Signal when the operation of the level shifting circuit 310 is stopped.

The level shifter L/S may output the feedback signal FB Signal to the above-described touch controller TCTR (refer to FIG. 1). The touch controller TCTR may control the operation of the touch driving circuit TDC (refer to FIG. 1) based on the level of the feedback signal FB Signal.

Accordingly, if an overcurrent flows in any one of the plurality of output pins D_TXout, the operation of the touch driving circuit TDC may be stopped under the control of the touch controller TCTR.

The start signal output pin D_VSTout corresponding to the start signal input pin D_VSTin may be in a floating state or may be grounded to a ground power source. The signal output to the start signal output pin D_VSTout may be output as, e.g., ground power.

The start signal VST may function as a signal for defining or selecting a period within the level shifter L/S. For example, a period between the timings when the start signals VST are consecutively input may be defined or selected as one period, and it may be possible to determine whether a short circuit occurs between two or more output pins D_TXout by sensing how many times overcurrent is detected during the one defined or selected period.

Accordingly, the start signal VST output to the start signal output pin D_VSTout may be input not to the above-described touch pad (e.g., X-touch pad X-TP; refer to FIG. 2) but to the ground power source.

Figure 6:
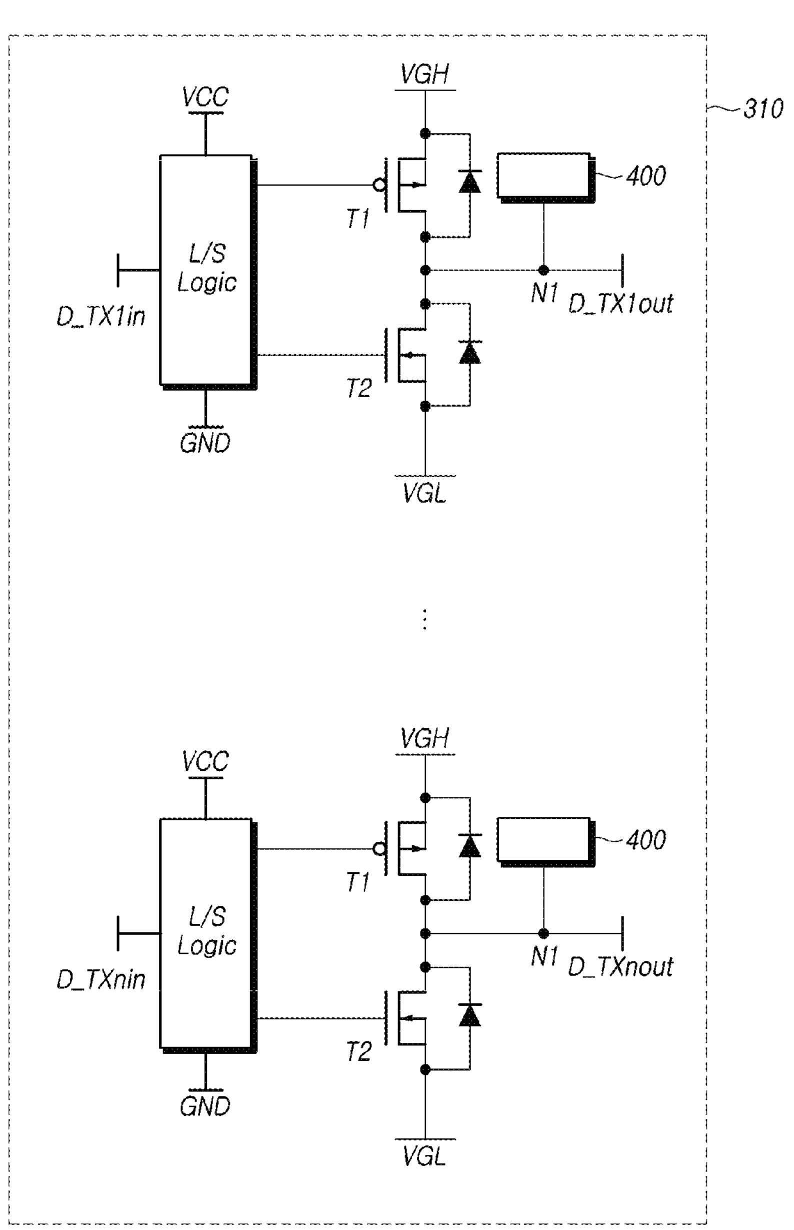
FIG. 6 is a view illustrating a level shifting circuit according to embodiments of the disclosure.

FIG. 6 is a view illustrating a level shifting circuit 310 according to embodiments of the disclosure.

The level shifting circuit 310 is a circuit configured to shift the voltage level of the signal input to each of the n input pins D_TX1in to D_TXnin and output the level-shifted signal to each of the n output pins D_TX1out to D_TXnout.

The level shifter logic L/S Logic outputs either the turn-on level voltage of the first transistor T1 or the turn-on level voltage of the second transistor T2 depending on the voltage level of the signal input to at least one of the plurality of input pins D_TXin.

referring to FIG. 6, the level shifting circuit 310 may include a CMOS circuit. The level shifting circuit 310 may include the first transistor T1 and the second transistor T2 for configuring the CMOS circuit.

For example, the first transistor T1 may be a PMOS transistor, and the second transistor T2 may be an NMOS transistor.

A source node of the first transistor T1 may be electrically connected to a high-potential voltage source. A drain node of the first transistor T1 may be electrically connected to a drain node of the second transistor T2. A source node of the second transistor T2 may be electrically connected to a low-potential voltage source.

If an AC signal is input to the input pin D_TXin, the level shifter logic L/S Logic may alternately output a high-level logic voltage for driving the first transistor T1 and a low-level logic voltage for driving the second transistor T2 according to the voltage level change timing of the input signal.

Referring to FIG. 6, if the first transistor T1 is turned on, a high-potential voltage may be output to the output pin D_TXout, and if the second transistor T2 is turned on, a low-potential voltage may be output to the output pin D_TXout.

The high-potential voltage supplied from the high-potential voltage source may be a gate high voltage VGH. The low-potential voltage supplied from the low-potential voltage source may be a gate low voltage VGL.

If a touch driving signal which is an AC signal is input to any one of the n input pins D_TX1in to D_TXnin, the level shifting circuit 310 alternately outputs the high-potential voltage and low-potential voltage from the output pin corresponding to the one input pin according to the voltage level change timing of the touch driving signal.

While a touch driving signal, which is an AC signal, is input to any one of the n input pins D_TX1in to D_TXnin, DC signals different from the touch driving signal may be input to the remaining input pins.

The level shifter logic L/S Logic may output the turn-on level voltage of the second transistor T2 based on the voltage level of the DC signal input to the remaining input pins.

Accordingly, while the touch driving signal, which is an AC signal, is input to any one of the n input pins D_TX1in to D_TXnin, the low-potential voltage (e.g., gate low voltage VGL) is output from the remaining output pins D_TXout corresponding to the remaining input pins.

The level shifting circuit 310 may further include an overcurrent detection circuit 400 electrically connected to the n output pins D_TX1out to D_TXnout.

The overcurrent detection circuit 400 may be electrically connected to n first nodes N1. The n first nodes N1 are electrically connected to at least one output pin among the n output pins D_TX1out to D_TXnout.

The overcurrent detection circuit 400 may be electrically connected to one or more first nodes N1. For example, when the first node N1 of the overcurrent detection circuit 400 is electrically connected to only one output pin D_TXout, as many overcurrent detection circuits 400 as the number of output pins D_TXout may be disposed in the level shifting circuit 310.

The overcurrent detection circuit 400 may be a circuit configured to sense whether a current higher than a preset current flows through the output pin D_TXout of the level shifter L/S. The overcurrent detection circuit 400 may also be referred to as a circuit configured to sense whether a current higher than a preset current flows through the X-touch pad X-TP.

When an overcurrent flows through any one of the plurality of output pins D_TXout may include, e.g., when the X-touch line X-TL (refer to FIG. 2) electrically connected with the output pin where the overcurrent flows is shorted, when the X-touch electrodes positioned in different X-touch electrode lines X-TEL (refer to FIG. 2) are shorted, or when the X-touch pad X-TP (refer to FIG. 2) is shorted.

For example, when the X-touch lines X-TL are shorted to each other or when the X-touch electrodes positioned in different X-touch electrode lines X-TEL are shorted to each other, a current path is formed between two different output pins D_TXout, and an overcurrent flows through the two output pins D_TXout and the X-touchpads X-TP electrically connected with the two output pins D_TXout.

The touch display device according to the disclosure may include a level shifter L/S for increasing the strength of the touch driving signal. As the level shifter L/S is disposed between the touch driving circuit and the plurality of X-touchpads X-TP, it is possible to determine whether the X-touch electrodes X-TE positioned in the different X-touch electrode lines X-TEL or the X-touch lines X-TL are shorted to each other by detecting the current flowing through the output pin D_TXout of the level shifter L/S.

Accordingly, the overcurrent detection circuit 400 electrically connected to the output pin D_TXout of the level shifter L/S may easily detect a short circuit in the X-touch line X-TL or X-touch electrode line X-TEL.

Figure 7:
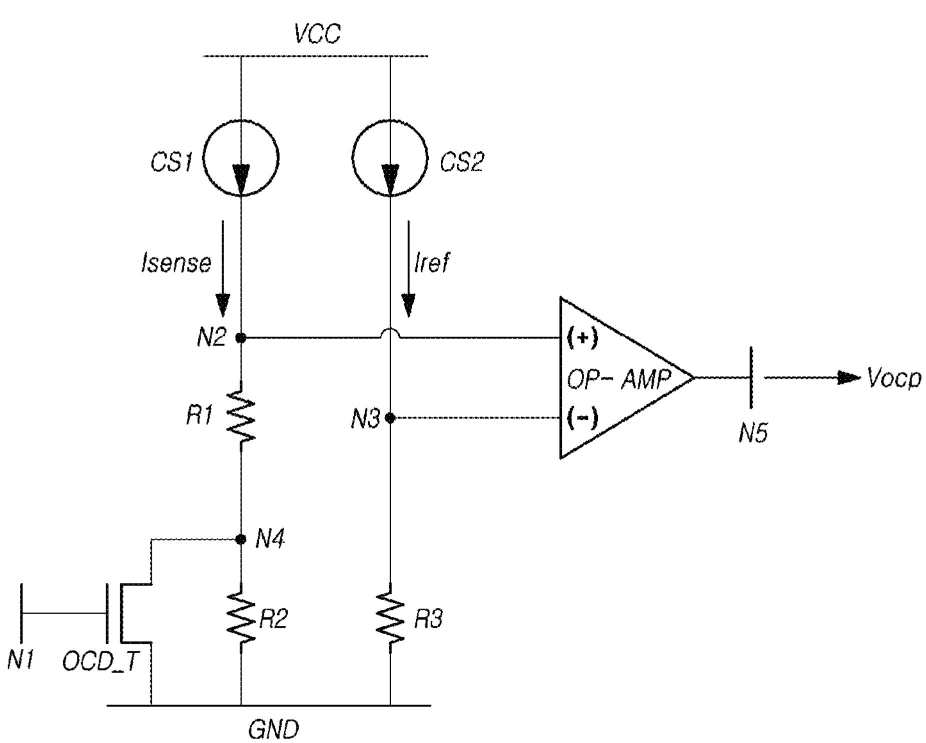
FIG. 7 is a view illustrating a configuration of an over-current detection circuit.

FIG. 7 is a view illustrating a configuration of an overcurrent detection circuit 400.

In FIG. 7, for convenience of description, the overcurrent detection circuit 400 is described as including the first node described above in connection with FIG. 6, but is not limited thereto. The overcurrent detection circuit 400 outputs a different voltage Vocp depending on whether an overcurrent equal to or larger than a preset current value flows in the first node N1 (which may refer to the first node N1 described in FIG. 6). The voltage Vocp output from the overcurrent detection circuit 400 is also referred to as an overcurrent protect voltage.

The overcurrent detection circuit 400 may include an overcurrent detecting transistor OCD_T, first to third resistors R1, R2, and R3, first and second current sources CS1 and CS2, and a comparator.

The overcurrent detecting transistor OCD_T is electrically connected to the output pin D_TXout.

When the overcurrent detection circuit 400 is electrically connected to only one output pin D_TXout, the potential of the gate node of the overcurrent detecting transistor OCD_T may be equal to the potential of the output pin D_TXout electrically connected to the corresponding overcurrent detection circuit 400. When the overcurrent detection circuit 400 is electrically connected to two or more output pins D_TXout, the gate node of the overcurrent detecting transistor OCD_T is electrically connected to two or more output pins D_TXout.

The overcurrent detecting transistor OCD_T is turned on or off depending on the magnitude of the current flowing through the gate node. For example, when a current larger than a preset reference current flows through the gate node of the overcurrent detecting transistor OCD_T, the overcurrent detecting transistor OCD_T may be turned on.

Either the source node or the drain node of the overcurrent detecting transistor OCD_T is electrically connected to the ground power source GND. The fourth node N4, which is the other node of the source node or the drain node of the overcurrent detecting transistor OCD_T, is electrically connected to the first resistor R1 and the second resistor R2.

The first resistor R1 is positioned between the second node N2 of the comparator and the fourth node N4 of the overcurrent detecting transistor OCD_T.

The second resistor R2 is positioned between the fourth node N4 of the overcurrent detecting transistor OCD_T and the ground power source GND.

The third resistor R3 is positioned between the third node N3 of the comparator and the ground power source GND.

The comparator may have a first input terminal and a second input terminal. The first input terminal may be electrically connected to the second node N2, and the second input terminal may be electrically connected to the third node N4. The comparator may be, e.g., an operational amplifier OP-AMP.

The first input terminal of the comparator may be a non-inverting signal input terminal (+), and the second input terminal may be an inverting signal input terminal (−). Alternatively, the first input terminal may be an inverting signal input terminal (−), and the second input terminal may be a non-inverting signal input terminal (+). For convenience of description, described below is an example in which the first input terminal is a non-inverting signal input terminal (+) and the second input terminal is an inverting signal input terminal (−), but embodiments of the disclosure are not limited thereto.

The voltage Vocp output from the comparator is input to the output terminal N5 of the comparator.

The first current source CS1 is electrically connected to each of the second node N2 of the comparator and the driving voltage source VCC. A first current Isense flows through the second node N2 toward the first resistor R1.

The second current source CS2 is electrically connected to each of the third node N3 of the comparator and the driving voltage source VCC. A second current Iref flows through the third node N3 toward the third resistor R3.

If the overcurrent detecting transistor OCD_T is turned on, the voltage applied to the second node N2 of the comparator is equal to V_N2 in Equation 1 below.

$$V\_N2 = GND + Isense * R1 \quad \text{[Equation 1]}$$

In Equation 1 above, V_N2 is the magnitude of the voltage applied to the second node N2 of the comparator, GND is the voltage of the ground power source GND, Isense is the magnitude of the first current Isense, and R1 is the resistance of the first resistor R1.

If the overcurrent detecting transistor OCD_T is turned off, the voltage applied to the second node N2 of the comparator is equal to V_N2 in Equation 2 below.

$$V\_N2 = GND + Isense * (R1 + R2) \quad \text{[Equation 2]}$$

In Equation 2 above, V_N2 is the magnitude of the voltage applied to the second node N2 of the comparator, GND is the voltage of the ground power source GND, Isense is the magnitude of the first current Isense, R1 is the resistance of the first resistor R1, and R2 is the resistance of the second resistor R2.

Regardless of whether the overcurrent detecting transistor OCD_T is turned on or off, the voltage applied to the third node N3 of the comparator is equal to V_N3 in Equation 3 below.

$$V\_N3 = GND + Iref * R3 \quad \text{[Equation 3]}$$

In Equation 3, V_N3 is the magnitude of the voltage applied to the third node N3 of the comparator, GND is the voltage of the ground power source GND, Iref is the magnitude of the second current Iref, and R3 is the resistance of the third resistor R3.

Accordingly, the magnitude of the voltage output from the output terminal N5 of the comparator varies depending on the magnitude of the current flowing through the gate node of the overcurrent detecting transistor OCD_T.

Accordingly, the overcurrent detection circuit 400 outputs a voltage Vocp reflecting whether an overcurrent flows through the output pin D_TXout.

Figure 8:
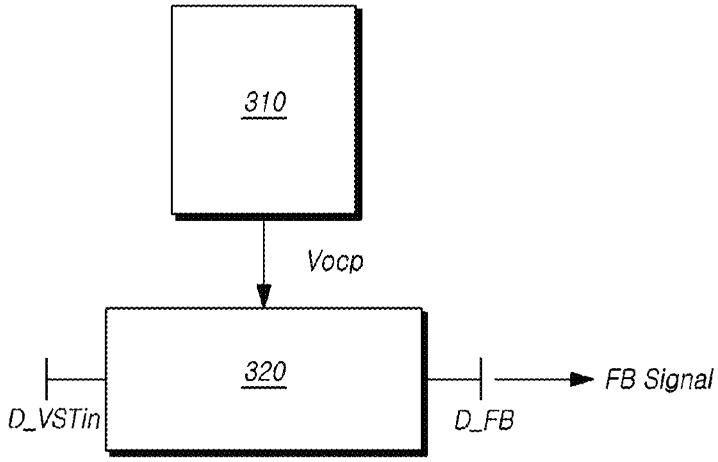
FIG. 8 is a view illustrating an operation of a level shifter operation control circuit.

FIG. 8 is a view illustrating an operation of a level shifter operation control circuit 320.

Referring to FIG. 8, the level shifter operation control circuit 320 receives an overcurrent protect voltage Vocp from the level shifting circuit 310 and receives a start signal from the start signal input pin D_VSTin.

The level shifter operation control circuit 320 according to embodiments of the disclosure may shut down the level shifting circuit 310 (or stop the operation of the level shifting circuit 310) or shut down the level shifter L/S if the voltage value of the overcurrent protect voltage Vocp is varied a preset number of times or more during the period when two consecutive start signals VST are input to the start signal input pin D_VSTin. The preset number may be one or more.

The level shifter operation control circuit 320 according to embodiments of the disclosure may be electrically connected to the plurality of output pins D_TXout described above. The level shifter operation control circuit 320 according to embodiments of the disclosure may shut down the level shifting circuit 310 (or stop the operation of the level shifting circuit 310) or shut down the level shifter L/S if a preset number of, or more, overcurrent pulses are detected during the period when two consecutive start signals VST are input to the start signal input pin D_VSTin. The preset number may be one or more.

The level shifter operation control circuit 320 may stop the operation of the level shifting circuit 310 and change the voltage level of the feedback signal FB Signal output to the feedback signal output pin D_FB.

It is assumed below that changing of the voltage level of the feedback signal FB Signal means stopping of the operation of the level shifting circuit 310.

The voltage level-changed feedback signal FB Signal may be input to the touch controller TCTR (refer to FIG. 1 described above), and the touch controller TCTR may stop the operation of the touch driving circuit TDC (refer to FIG. 1 described above).

Figure 9:
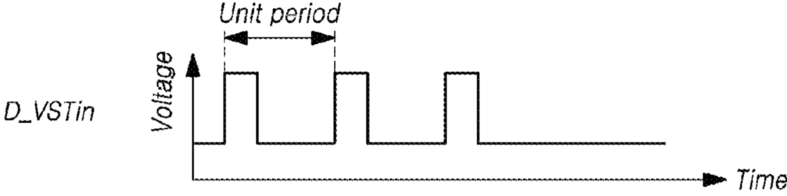
FIG. 9 is a view illustrating an example in which the voltage level of a feedback signal is varied.
Figure 9:
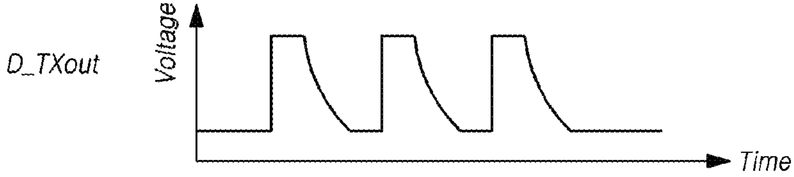
Figure 9:
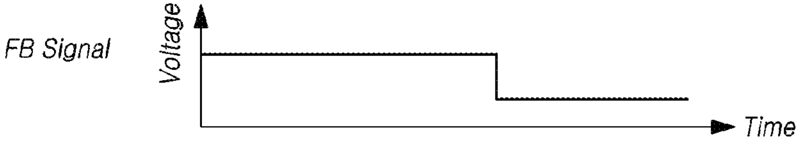

FIG. 9 is a view illustrating an example in which the voltage level of a feedback signal FB Signal is varied.

Referring to FIG. 9, in embodiments of the disclosure, if an overcurrent flows through any one of the plurality of output pins D_TXout during a unit period between the times when two consecutive start signals are input, the voltage level of the feedback signal FB Signal may be changed.

Referring to FIG. 9, the level shifter operation control circuit 320 according to embodiments of the disclosure may change the voltage level of the feedback signal FB Signal if an overcurrent flows during consecutive unit periods.

The time-voltage graph of the output pin D_TXout shown in FIG. 9 is a graph illustrating, on the time axis, an example waveform when an overvoltage is output from the shorted output pin D_TXout.

Referring to the time-voltage graph of the output pin D_TXout shown in FIG. 9, the voltage level of the voltage output from the shorted output pin D_TXout may momentarily increase and then gradually decrease during one unit period.

The time when the voltage momentarily increases may be the time when the signal output from another output pin shorted with the corresponding output pin D_TXout is input to the corresponding output pin D_TXout. For example, the time may be a point in time when the first pulse of the touch driving signal output from the other output pin is input. The touch driving signal may be a level-shifted touch driving signal.

The voltage of the corresponding output pin D_TXout may gradually decrease after the last pulse of the touch driving signal output from the other output pin shorted with the corresponding output pin D_TXout is input.

The level shifter operation control circuit 320 of the disclosure may change the voltage level of the feedback signal FB Signal if an overcurrent flows through the output pin D_TXout for a preset number of unit periods.

The preset number may be one or more.

The level shifter operation control circuit 320 of the disclosure may change the voltage level of the feedback signal FB Signal if an overcurrent flows through the output pin D_TXout for a preset number of consecutive unit periods. The preset number may be two or more.

The level shifter operation control circuit 320 of the disclosure increases the count whenever an overcurrent flows through the output pin D_TXout during the unit period and reset the count if no overcurrent flows through the output pin D_TXout during the unit period. Accordingly, the level shifter L/S of the disclosure may change the voltage level of the feedback signal FB Signal if an overcurrent flows through the output pin D_TXout for a preset number of continuous unit periods.

Although not shown in FIG. 9, the level shifter operation control circuit 320 of the disclosure may change the voltage level of the feedback signal FB Signal if the voltage value of the overcurrent protect voltage Vocp is varied a preset number of times or more during the unit period between the times when two consecutive start signals are input.

The level shifter operation control circuit 320 of the disclosure may change the voltage level of the feedback signal FB Signal if the voltage level of the overcurrent protect voltage Vocp is changed or an overcurrent flows through any one of the plurality of output pins D_TXout during one unit period.

If one unit period elapses, the level shifter operation control circuit 320 may reset the number of times of detection of an overcurrent pulse flowing through the output pin D_TXout and/or the number of times of detection of a change in the voltage level of the overcurrent protect voltage Vocp during the corresponding unit period.

The start signal of the disclosure may be a signal output from the touch driving circuit TDC and input to the level shifter L/S.

The timing at which the start signal is input to the level shifter L/S may be designed in various ways.

The touch driving circuit TDC of the disclosure may output a start signal, e.g., at every time point immediately before outputting the touch driving signal to the first input pin D_TX1in (refer to FIG. 5) of the level shifter L/S. The start signal may be a signal having a frequency different from that of the touch driving signal.

The start signal may be, e.g., a start signal VST (refer to FIG. 5) including one or more pulses.

For convenience of description, it is assumed below that the start signal is a start signal VST which is one pulse.

The level shifter L/S may sequentially output the level-shifted touch driving signal from the plurality of output pins D_TXout after the start signal VST is input.

The touch driving circuit TDC according to the disclosure may output the start signal VST at every point in time immediately before outputting the touch driving signal to the first input pin D_TX1in of the level shifter L/S and at every point in time after outputting the touch driving signal to the nth input pin D_TXnin.

If an overcurrent path is formed between the output pin to which the AC signal is output and the output pin to which the low-potential voltage is applied, the overcurrent detecting transistor OCD_T is turned on multiple times. Accordingly, the voltage level of the overcurrent protect voltage Vocp is varied multiple times.

The level shifter operation control circuit 320 may change the voltage level of the feedback signal FB Signal at a point in time when the voltage level of the overcurrent protect voltage Vocp have been varied a preset number of times or more or at an end point.

Referring to FIG. 9, after the voltage level of the feedback signal FB Signal is changed, the start signal VST may not be input to the start signal input pin D_VSTin.

Specifically, the touch controller TCTR may control the touch driving circuit TDC not to output the start signal VST and the touch driving signal based on the changed voltage level of the feedback signal FB Signal.

According to embodiments of the disclosure, the level shifter L/S has the start signal pin D_VSTin to which a start signal having a frequency different from the touch driving signal is input. Thus, although an overcurrent flows through any one of the plurality of output pins D_TXout disposed in the level shifter L/S during the unit period, it is possible to precisely detect the overcurrent and accordingly stop the operation of the level shifting circuit. Accordingly, damage to the touch display device may be minimized or reduced.

Figure 10:
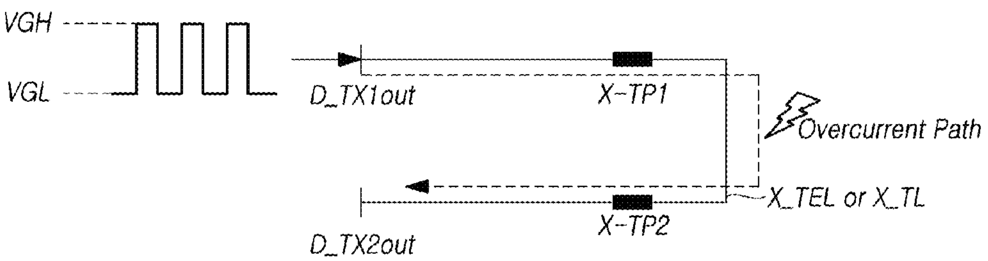
FIG. 10 is a view illustrating an example current flow when an overcurrent path is formed between a first output pin and a second output pin.

FIG. 10 is a view illustrating an example current flow when an overcurrent path is formed between a first output pin D_TX1out and a second output pin D_TX2out.

Referring to FIG. 10, an AC signal in which low-potential voltages and high-potential voltages are alternately output may be output to the first output pin D_TX1out.

The AC signal output to the first output pin D_TX1out may be a level-shifted touch driving signal.

According to the foregoing description, while the AC signal in which the low-potential voltage and the high-potential voltage are alternately output is output to the first output pin D_TX1out a low-potential voltage should be applied to the second output pin D_TX2out. However, when the first output pin D_TX1out and the second output pin D_TX2out are shorted, the high-potential voltage output from the first output pin D_TX1out may be input to the second output pin D_TX2out.

The first output pin D_TX1out may be electrically connected to the first X-touch pad X-TP1, and the second output pin D_TX2out may be electrically connected to the second X-touch pad X-TP2.

When the X-touch electrode line X-TEL or X-touch line X-TL electrically connected with the first X-touch pad X-TP1 is shorted with the X-touch electrode line X-TEL or X-touch line X-TL electrically connected with the second X-touch pad X-TP2, the first output pin D_TX1out and the second output pin D_TX2out are electrically connected with each other.

Likewise, when the first X-touch pad X-TP and the second X-touch pad X-TP2 are shorted, the first output pin D_TX1out and the second output pin D_TX2out are electrically connected with each other.

While the high-potential voltage is applied to the first output pin D_TX1out an overcurrent flows through the path electrically connecting the first output pin D_TX1out and the second output pin D_TX2out.

Figure 11:
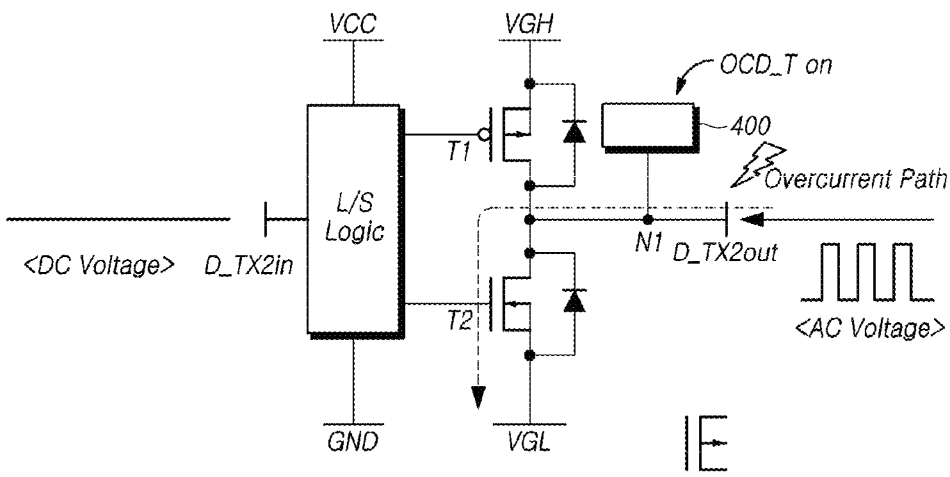
FIG. 11 is a view illustrating an example signal applied to a second input pin and a second output pin when the overcurrent path of FIG. 10 is formed.

FIG. 11 is a view illustrating an example signal applied to a second input pin D_TX2in and a second output pin D_TX2out when the overcurrent path of FIG. 10 is formed.

Referring to FIG. 11, a DC voltage is applied to the second input pin D_TX2in, but an AC voltage is applied to the second output pin D_TX2out.

The level shifter logic L/S Logic outputs the turn-on level voltage of the second transistor T2 based on the voltage level of the DC voltage input to the second input pin D_TX2in.

Accordingly, the second output pin D_TX2out and the low-potential power source VGL are electrically connected.

While the second transistor T2 electrically connected to the second output pin D_TX2out stays on, the AC signal output from the first output pin D_TX1out passes through the second output pin D_TX2out to the low-potential power source VGL. An overcurrent flows through the first node N1 of the overcurrent detection circuit 400 electrically connected to the second output pin D_TX2out.

The overcurrent detecting transistor OCD_T of the overcurrent detection circuit 400 electrically connected to the second output pin D_TX2out is turned on and, as described above, the voltage level of the voltage output from the overcurrent detection circuit 400 is changed.

The level shifter operation control circuit 320 may stop the operation of the level shifting circuit 310.

As the level shifter L/S includes an overcurrent detection circuit electrically connected to the output pin D_TXout, it is possible to easily determine whether a short circuit occurs between touch electrodes positioned on different touch electrode lines.

Figure 12:
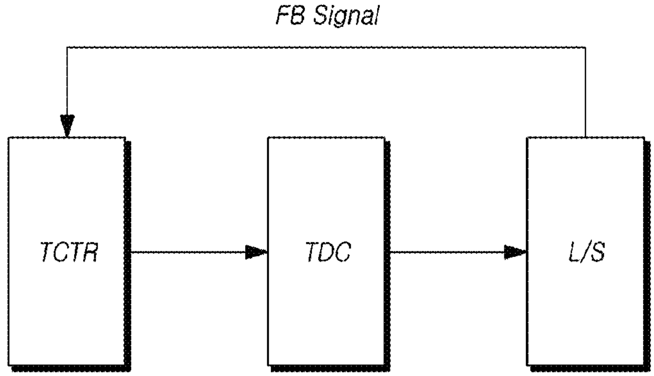
FIG. 12 is a view illustrating an example in which a level shifter L/S provides a feedback signal reflecting the state of the touch panel to a touch controller according to embodiments of the disclosure.

FIG. 12 is a view illustrating an example in which a level shifter L/S provides a feedback signal FB Signal reflecting the state of the touch panel TSP to a touch controller TCTR according to embodiments of the disclosure.

Referring to FIG. 12, the level shifter L/S according to embodiments of the disclosure is disposed between the touch driving circuit TDC and the plurality of touch driving electrodes. In other words, the level shifter L/S according to embodiments of the disclosure assumes that the touch driving signal output from the touch driving circuit TDC is input to the level shifter L/S.

The touch driving signal output from the touch driving circuit TDC is level-shifted by the level shifter L/S and input to any one touch electrode line X-TEL.

In the touch display device according to the disclosure, unlike the prior art, the touch driving circuit TDC does not directly output the touch driving signal to the touch panel TSP but outputs the touch driving signal to the level shifter L/S.

Accordingly, the touch driving circuit TDC may not be aware of the state of the touch panel TSP (refer to FIG. 1), e.g., whether there is a short circuit between the touch electrode lines. Accordingly, the level-shifted touch driving signal may be continuously input to the shorted touch electrode lines.

The level shifter L/S according to embodiments of the disclosure has an overcurrent detection circuit for detecting whether an overcurrent flows through a plurality of output pins and may thus output a feedback signal FB Signal reflecting the state of the touch panel TSP.

The feedback signal FB signal output from the level shifter L/S may be input to the touch controller TCTR. The touch controller TCTR may stop driving the touch driving circuit TDC or stop touch sensing by reflecting the state of the touch panel TSP.

The level shifter L/S may differently output the feedback signal FB Signal if the output voltage Vocp of the overcurrent detection circuit is varied a preset number of times or more during the unit period between the times when consecutive start signals are input. In this case, it is possible to reduce erroneous occasions where the touch panel TSP is determined to have abnormality even when it is not the case indeed.

Therefore, there may be provided a touch display device including a level shifter L/S that allows it to be easily known whether the touch panel TSP has an abnormality.

The foregoing embodiments of the disclosure are briefly described below.

According to an embodiment of the disclosure, there may be provided a touch display device comprising a plurality of touch electrodes TE and an overcurrent detection circuit 400 configured to detect a current flowing through at least one touch pad TP electrically connected with at least one touch electrode TE among the plurality of touch electrodes TE.

According to embodiments of the disclosure, there may be provided the touch display device further comprising a touch driving circuit TDC outputting a touch driving signal and a level shifter L/S including a plurality of output pins D_TXout, the level shifter L/S controlling a voltage level of the touch driving signal and outputting the voltage level-controlled touch driving signal to the at least one touch pad, wherein the overcurrent detection circuit 400 is electrically connected to at least one output pin D_TXout among the plurality of output pins D_TXout.

According to embodiments of the disclosure, there may be provided the touch display device, wherein in the level shifter L/S, while any one output pin D_TXout among the plurality of output pins D_TXout is electrically connected alternately to a high-potential voltage source and a low-potential voltage source, remaining output pins D_TXout except for the any one output pin D_TXout among the plurality of output pins are electrically connected to the low-potential voltage source.

According to embodiments of the disclosure, there may be provided the touch display device, wherein the touch driving circuit TDC inputs the touch driving signal to the level shifter L/S.

According to embodiments of the disclosure, there may be provided the touch display device, wherein the level shifter L/S is positioned between the touch driving circuit TDC and the plurality of touch electrodes.

According to embodiments of the disclosure, there may be provided the touch display device, wherein the level shifter L/S shifts the voltage level of the touch driving signal and outputs the level-shifted touch driving signal to the at least one touch pad.

According to embodiments of the disclosure, there may be provided the touch display device, wherein if a current larger than a preset value flows through any one output pin D_TXout among the plurality of output pins D_TXout, a voltage Vocp output from the overcurrent detection circuit 400 is varied.

According to embodiments of the disclosure, there may be provided the touch display device, wherein the level shifter L/S further includes a start signal input pin D_VSTin to which a start signal VST is input, and wherein the level shifter L/S sequentially outputs the level-shifted touch driving signal from the plurality of output pins D_TXout after the start signal VST is input.

According to embodiments of the disclosure, there may be provided the touch display device further comprising a level shifter operation control circuit 320, wherein the level shifter operation control circuit 320 shuts down a level shifting circuit 310 in the level shifter if the voltage Vocp output from the overcurrent detection circuit 400 is varied during a unit period between times when the start signal VST is consecutively input.

According to embodiments of the disclosure, there may be provided the touch display device, wherein the level shifter L/S further includes a feedback signal output pin D_FB outputting a feedback signal FB Signal which has different value depending on whether an overcurrent flows through any one output pin D_TXout among the plurality of output pins D_TXout.

According to embodiments of the disclosure, there may be provided the touch display device further comprising a touch panel TSP including a plurality of touch electrode lines X-TEL and a plurality of touch lines X-TL electrically connected to the plurality of touch electrode lines X-TEL, wherein the feedback signal FB Signal is a signal reflecting at least one of whether touch electrodes X-TE included in different touch electrode lines X-TEL are shorted, whether the touch lines X-TEL are shorted, or whether the touch pads X-TP are shorted.

According to embodiments of the disclosure, there may be provided the touch display device, wherein the overcurrent detection circuit 400 includes an overcurrent detecting transistor OCD_T having a gate node N1 electrically connected to at least one output pin D_TXout among the plurality of output pins D_TXout and a comparator outputting a different voltage Vocp depending on whether the overcurrent detecting transistor OCD_T is turned on or off.

According to embodiments of the disclosure, there may be provided the touch display device, wherein an encapsulation layer ENCAP is disposed on a light emitting element, and wherein the plurality of touch electrodes are disposed on the encapsulation layer ENCAP.

According to embodiments of the disclosure, there may be provided the touch display device, wherein an amplitude of a post-level shifting touch driving signal is larger than an amplitude of a pre-level shifting touch driving signal.

According to embodiments of the disclosure, there may be provided a level shifter L/S for a touch display device, comprising a plurality of output pins D_TXout and an overcurrent detection circuit 400 for detecting whether an overcurrent flows through the plurality of output pins D_TXout, wherein the level shifter L/S shifts a voltage level of an alternating current (AC) signal output from a touch driving circuit TDC and outputs the level-shifted signal to a touch panel TSP.

According to embodiments of the disclosure, there may be provided the level shifter L/S, wherein the overcurrent detection circuit 400 includes an overcurrent detecting transistor OCD_T having a gate node N1 electrically connected to at least one output pin among the plurality of output pins D_TXout and turning on or off depending on a magnitude of a current flowing through the gate node N1.

According to embodiments of the disclosure, there may be provided the level shifter L/S, wherein the overcurrent detection circuit 400 further includes a comparator having a first input terminal electrically connected with a source node or drain node of the overcurrent detecting transistor OCD_T and a second input terminal electrically connected with a ground power source.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A touch display device, comprising:

a substrate;

a first transistor disposed on the substrate;

a light emitting element disposed on the first transistor;

an encapsulation layer disposed on the light emitting element;

a plurality of touch electrodes on the encapsulation layer, the plurality of touch electrodes having X-touch electrode lines that extend in a first direction and Y-touch electrode lines that extend in a second direction different from the first direction;

a plurality of X-touch lines connected to the X-touch electrode lines and a plurality of Y-touch lines connected to the Y-touch electrode lines in a non-display area of the substrate;

a dam disposed on the non-display area; and a touch driving circuit configured to output a touch driving signal, wherein the X-touch electrode lines include X-touch electrodes positioned on two opposite sides of the Y-touch electrode lines, each Y-touch electrode line having one or more single bar structures extending in the second direction, and wherein the X-touch lines or the Y-touch lines overlap with the dam.

2. The touch display device of claim 1, further comprising a plurality of touch pads disposed in the non-display area, the plurality of touch pads including an X-touch pad and a Y-touch pad.

3. The touch display device of claim 2, wherein one of the X-touch lines or one of the Y-touch lines is connected to the corresponding X-touch pad or Y-touch pad.

4. The touch display device of claim 1, wherein the X-touch electrodes have a same shape as each other.

5. The touch display device of claim 1, wherein the Y-touch electrode lines have a single bar-shaped structure.

6. The touch display device of claim 1, wherein the Y-touch electrode lines have a split two bar-shaped structure.

7. The touch display device of claim 5, wherein the Y-touch electrode lines have a plate-shaped structure or a mesh structure.

8. The touch display device of claim 1, wherein the X-touch electrodes positioned on the two opposite sides of the Y-touch electrode lines are electrically connected with a touch electrode connection line.

9. The touch display device of claim 8, wherein the touch electrode connection line crosses the Y-touch electrode line.

10. The touch display device of claim 2, wherein the encapsulation layer is disposed on the X-touch pad or the Y-touch pad.

11. The touch display device of claim 8, wherein the touch electrode connection line overlaps with a bank.

12. A touch display device, comprising:

a substrate;

a first transistor disposed on the substrate;

a light emitting element disposed on the first transistor;

an encapsulation layer disposed on the light emitting element;

a plurality of touch electrodes on the encapsulation layer, the plurality of touch electrodes having X-touch electrode lines that extend in a first direction and Y-touch electrode lines that extend in a second direction different from the first direction;

a plurality of X-touch lines connected to the X-touch electrode lines and a plurality of Y-touch lines connected to the Y-touch electrode lines in a non-display area of the substrate;

a dam disposed on the non-display area; and a touch driving circuit configured to output a touch driving signal, wherein the X-touch electrode lines include X-touch electrodes positioned on two opposite sides of the Y-touch electrode lines, each Y-touch electrode line having one or more single bar structures extending in the second direction, and wherein an area of the X-touch electrode lines is different from an area of the Y-touch electrode lines.

13. The touch display device of claim 12, wherein the area of the Y-touch electrode lines is smaller than the area of the X-touch electrode lines.

14. The touch display device of claim 13, wherein a ratio of the area of the X-touch electrode lines to the area of the Y-touch electrode lines is in a range of 5:1 to 2:1.

15. The touch display device of claim 12, wherein an area of each of the X-touch electrodes positioned on the two opposite sides of the Y-touch electrode lines are equal.

16. The touch display device of claim 12, wherein an area of each of the X-touch electrodes positioned on the two opposite sides of the Y-touch electrode lines are different from each other.

17. The touch display device of claim 12, wherein the substrate includes a long side and a short side, and the touch driving circuit is configured to apply touch driving signals to both ends of the X-electrode lines or Y-electrode lines extending along the long side of the substrate, respectively.

18. The touch display device of claim 12, wherein the X-touch lines or the Y-touch lines are a single stacked structure or a double stacked structure.

19. The touch display device of claim 18, wherein the double stacked structure of the X-touch lines or the Y-touch lines includes a touch bridge line extending in a same direction as the X-touch lines or the Y-touch lines and disposed below the X-touch lines or the Y-touch lines.

20. The touch display device of claim 19, wherein a width of the touch bridge line is equal to or greater than a width of the X-touch lines or the Y-touch lines.

21. A touch display device, comprising:

a substrate;

a first transistor disposed on the substrate;

a light emitting element disposed on the first transistor;

an encapsulation layer disposed on the light emitting element;

a plurality of touch electrodes on the encapsulation layer, the plurality of touch electrodes having X-touch electrode lines that extend in a first direction and Y-touch electrode lines that extend in a second direction different from the first direction, the Y-touch electrode lines each having one or more single bar structures extending in the second direction;

a plurality of X-touch lines connected to the X-touch electrode lines and a plurality of Y-touch lines connected to the Y-touch electrode lines in a non-display area of the substrate;

a dam disposed on the non-display area;

a touch driving circuit configured to output a touch driving signal; and a level shifter configured to generate a voltage level-controlled touch driving signal by controlling a voltage level of the touch driving signal, and the level shifter is further configured to output the voltage level-controlled touch driving signal.

22. The touch display device of claim 21, further comprising:

an overcurrent detection circuit configured to detect a current flowing through at least one touch pad electrically connected with at least one touch electrode of the plurality of touch electrodes.

23. The touch display device of claim 22, wherein the level shifter includes a plurality of output pins, the level shifter configured to output the voltage level-controlled touch driving signal to the at least one touch pad, wherein the overcurrent detection circuit is electrically connected to at least one output pin of the plurality of output pins.

24. The touch display device of claim 23, wherein a first output pin of the plurality of output pins is electrically connected alternately to a high-potential voltage source and a low-potential voltage source, and remaining second output pins of the plurality of output pins excluding the first output pin are electrically connected to the low-potential voltage source.

25. The touch display device of claim 21, wherein the level shifter is positioned between the touch driving circuit and the plurality of touch electrodes.

26. The touch display device of claim 24, wherein the level shifter is configured to generate a level-shifted touch driving signal by shifting the voltage level of the touch driving signal, the level shifter is further configured to output the level-shifted touch driving signal to the at least one touch pad.

27. The touch display device of claim 26, wherein a voltage configured to be output from the overcurrent detection circuit varies in response to a current greater than a threshold current flowing through any one of the plurality of output pins.

28. The touch display device of claim 27, wherein the level shifter further includes a start signal input pin configured to receive a start signal, and wherein the level shifter is configured to sequentially output the level-shifted touch driving signal from the plurality of output pins after the start signal is received at the start signal input pin.

29. The touch display device of claim 28, further comprising a level shifter operation control circuit, wherein the level shifter operation control circuit is configured to shut down a level shifting circuit in the level shifter in response to the voltage output from the overcurrent detection circuit being varied during a time period between consecutive inputs of the start signal.

30. The touch display device of claim 23, wherein the level shifter further includes a feedback signal output pin configured to output a feedback signal which has a different value when an overcurrent flows through any one of the plurality of output pins than when the overcurrent does not flow through the any one of the plurality of output pins.

31. The touch display device of claim 30, further comprising a touch panel including the X-touch electrode lines and the Y-touch electrode lines and a plurality of touch lines electrically connected to the X-touch electrode lines and the Y-touch electrode lines, wherein the feedback signal is a signal associated with at least one of the X-touch electrodes included in different X-touch electrode lines being shorted, the X-touch lines being shorted, or the X-touch pads being shorted.

32. The touch display device of claim 22, wherein the overcurrent detection circuit includes:

an overcurrent detecting transistor having a gate node electrically connected to at least one output pin of the plurality of output pins; and a comparator configured to output a different voltage when the overcurrent detecting transistor is turned on than when the overcurrent detecting transistor is turned off.

33. The touch display device of claim 26, wherein an amplitude of a post-level shifting touch driving signal is larger than an amplitude of a pre-level shifting touch driving signal.

* * * * *